G. J. WALLACE.
PESSARY.
APPLICATION FILED JUNE 29, 1920.

1,382,033.

Patented June 21, 1921.

Inventor
Georgina J. Wallace,
by Herbert W. Jenner
Attorney.

UNITED STATES PATENT OFFICE.

GEORGINA JANE WALLACE, OF KENSINGTON, LONDON, ENGLAND.

PESSARY.

1,382,033.          Specification of Letters Patent.     Patented June 21, 1921.

Application filed June 29, 1920. Serial No. 392,740.

*To all whom it may concern:*

Be it known that I, GEORGINA JANE WALLACE, a subject of the King of Great Britain, residing at 22 Campden Hill Court, Kensington, London, W. 8., England, have invented new and useful Improvements in Pessaries, of which the following is a specification.

This invention has reference to pessaries or surgical instruments for preventing a lapsus uteri in females, the object being to produce a pessary which can be easily and safely placed in position and removed by the wearer; and which, when in use will cause no discomfort or pain.

According to this invention, the body of the pessary is made of soft rubber with a hollow head filled with a liquid preferably non-elastic, such as glycerin, capable of being expanded and contracted laterally. The stem of the pessary is hollow also, and passing down the center of this stem is a rod, the inner end of which projects through the hollow head, and is secured to a plate embedded in the rubber of the upper part of the head. After the head has been filled with the liquid, another plate or washer is fixed on to the extreme end of this rod, and the orifice in the head sealed by a rubber patch which covers the latter plate or washer.

The other end of this rod is screw threaded to receive a tapped sleeve fitting loosely in a tube secured in the lower end of the stem; and in order to prevent the rod from turning when the sleeve is revolved, two projections are formed on said rod, which take into slots formed in the tube. Fitting around the center portion of the sleeve is a collar or bearing held in a fixed position in the tube, which collar acts as a means for keeping the sleeve in place, but allows it to revolve freely.

In order that the invention may be clearly understood I have appended the accompanying drawing.

A represents the head of the pessary, B the stem, D the metal rod, the inner end of which is secured to the plate $a^1$ embedded in the rubber of the upper part of the head A; $a^2$ another plate or washer fixed on to the extreme end of the rod D, after the head has been filled with the liquid; $a^3$ the rubber washer which seals the orifice in said head; E the headed sleeve which screws on to the lower end of the rod D; F the slotted tube fixed in the lower end of the stem B, $d^1$ the projections on the rod D which take into the slots $f^1$ in the tube F, H the collar or bearing in which the sleeve E revolves, which collar is fixed in the lower end of the tube F; and $h^1$ the collar fixed to the sleeve E above the collar H, to prevent said sleeve from screwing off the end of the rod D.

Figure 1:
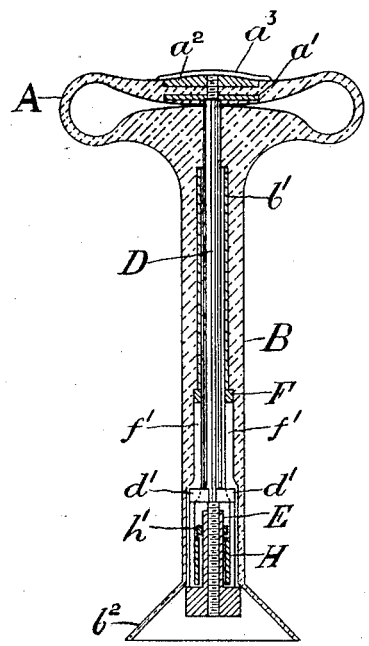
Figure 1 is a longitudinal part sectional view of a pessary constructed according to this invention, showing the lateral expansion of the head when placed in position.
Figure 2:
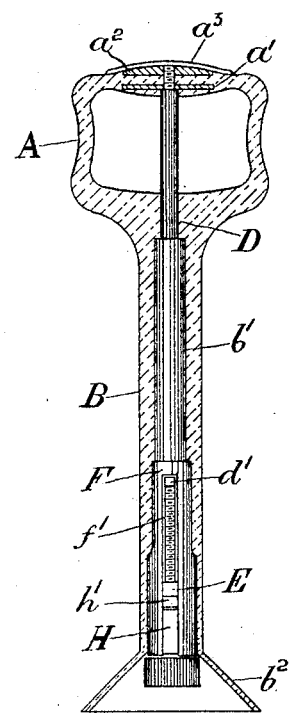
Fig. 2 is a longitudinal part sectional view showing the head of the pessary contracted laterally and expanded longitudinally ready for removal or insertion.

Now if the stem B is firmly held, and the sleeve E turned in the one direction, the rod D will move up said stem and contract the head A laterally, and extend it longitudinally, as shown by Fig. 2, so that the instrument can then be easily placed in position. After the instrument has been placed in position, by turning the sleeve E in the reverse direction, the rod D will move down the stem B and contract the head A longitudinally causing the liquid contained therein to expand said head laterally, thereby securely holding said instrument in place.

The central portion of the stem B is preferably reinforced internally by the tube $b^1$, and also externally with a rubber impregnated fabric to hold the parts together and to prevent stretching when contracting or expanding the head A. A rubber shield $b^2$ is also preferably formed at the lower end of the stem, to prevent contact of flesh with the head of sleeve E when the instrument is in use, and to prevent the fingers nipping the skin when turning the sleeve.

By constructing a pessary in the manner herein set forth and shown, such instrument can be easily and safely placed in position, and removed by the wearer without danger or discomfort.

What I claim as my invention and desire to secure by Letters Patent is:—

1. In a pessary, a stem, a hollow head of elastic material secured to the stem, and an operating device slidable longitudinally of the stem and having one end portion secured to the outer end of the hollow head and affording a means for drawing its ends together and thereby expanding its middle portion.

2. In a pessary, a tubular stem, a hollow head of elastic material formed integral with the stem and adapted to contain fluid, and an operating rod slidable longitudinally in the stem and having one end portion secured to the outer end of the hollow head and affording a means for expanding its middle portion by drawing together its ends.

3. A pessary having a hollow head filled with a liquid, the upper part of said head being connected to a rod passing down the stem of the pessary, and capable of being operated so as to move up and down said stem for the purpose of expanding and contracting said head.

4. A pessary in which the head is capable of being expanded longitudinally, and contracted laterally by the movement of a rod in the one direction, and contracted longitudinally by the reverse movement of said rod, said longitudinal contraction causing a liquid in the head to expand said head laterally for the purpose set forth.

In testimony whereof I have signed my name to this specification in the presence of two subscribing witnesses.

GEORGINA JANE WALLACE.

Witnesses:
ARTHUR CUTHBERT,
H. W. DENTON INGHAM.